Jan. 9, 1962 G. GASSNER 3,016,085
APPARATUS FOR HEAT SEALING A THERMOPLASTIC WEB IN WHICH
THE HEAT IS CONTROLLED BY THE SPEED OF THE WEB
Filed Dec. 23, 1959
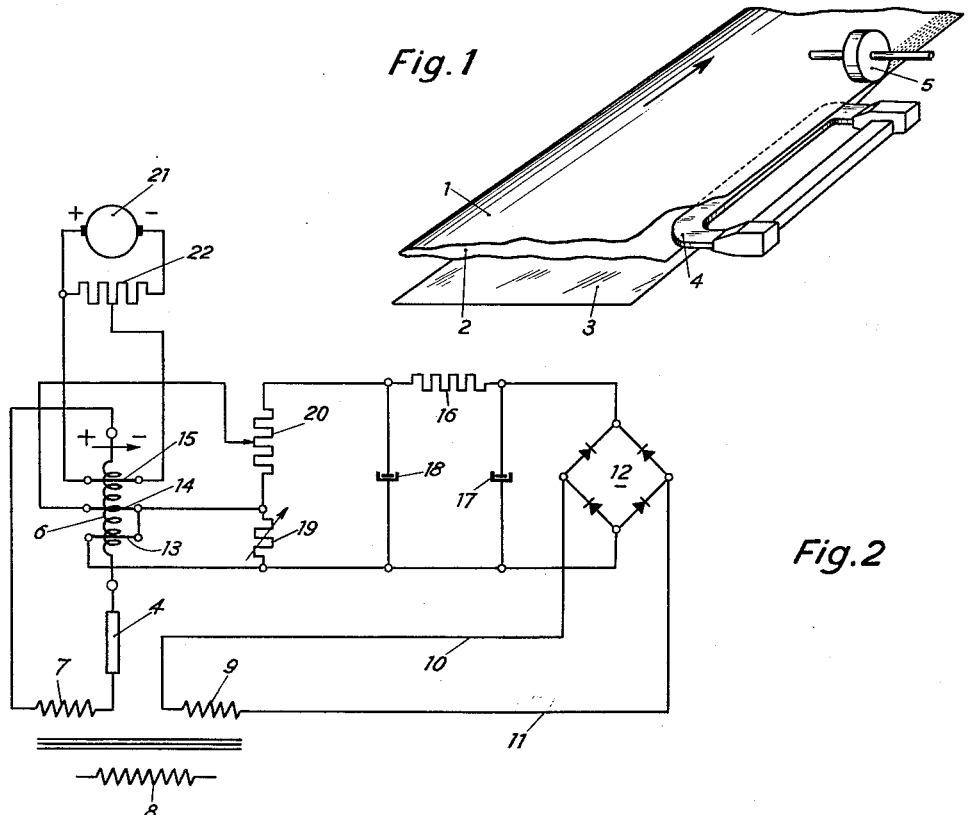
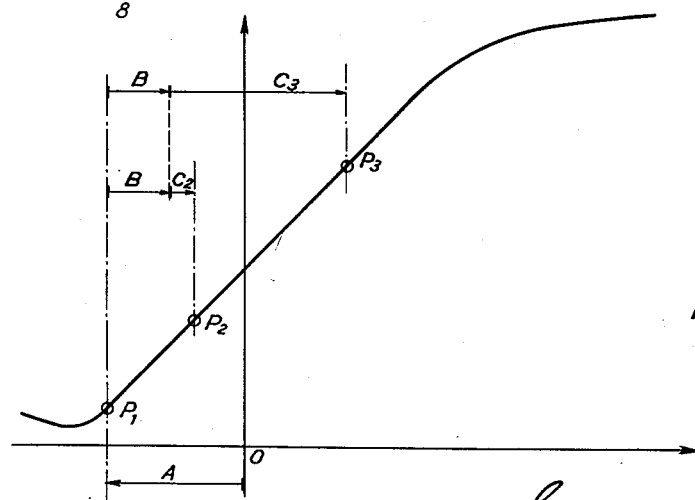
Georges Gassner
By Beaman & Beaman
atty

United States Patent Office 3,016,085
Patented Jan. 9, 1962

3,016,085
APPARATUS FOR HEAT SEALING A THERMOPLASTIC WEB IN WHICH THE HEAT IS CONTROLLED BY THE SPEED OF THE WEB
Georges Gassner, Schiltigheim, France, assignor to Les Ateliers de Constructions Mecaniques C. & A. Holweg, Strasbourg, France, a responsible limited society
Filed Dec. 23, 1959, Ser. No. 861,511
Claims priority, application France Jan. 5, 1959
6 Claims. (Cl. 156—359)

The present invention relates to the art of sealing composite or complex assemblies capable of being welded together in the hot state when manufacturing tubes or hoses such as those which are used in the production of tight packings or wrappings.

The general expression "composite assemblies weldable in the hot state" includes films that are covered with a suitable coating imparting to them their property of being weldable in the hot state as for example cellulose films, synthetic materials that are themselves weldable in the hot state without requiring any application of a special coating as for example polyethylene and other plastics, materials constituting a combination of any one of the aforesaid materials with other substances such as paper adapted to impart to the assembly improved qualities so far as rigidity, strength or toughness are concerned.

Hitherto welding in the hot state of such composite assemblies has been effected by applying heat through the mass of the several superimposed layers to be coalesced by a welding action. The result of this was that in order to stave off the risk of an overheating of relatively thick composite assemblies and the ensuing damage of the materials, the production rhythm had to be slowed down in proportion as the overall thickness of the assembly was increasing. The technical solution consisting in increasing the length of the heating path of travel in order to avoid having to reduce the production tempo was most hazardous because it soon led to unduly long travelling paths.

The primary object of the invention is to provide an improved method for sealing composite or complex assemblies weldable in the hot state for eliminating the aforesaid disadvantages, said method being characterized by the fact that instead of applying heat through the mass of layers of materials to be coalesced, direct heating by radiation is imparted only to those faces adapted to come into mutual contact, said faces being finally united by coalescence by pressing them against each other.

This direct heating of only those faces which have to be welded together in the hot state permits the same production rhythm to be maintained irrespective of the thickness of the composite assembly which has to be treated.

Another object of the invention is to provide a device for carrying into practice the aforesaid method comprising at least one radiating heating element of substantially flat shape having a length adapted to the required heating intensity, also a pair of presser rollers arranged in the direction of flow beyond said heating element and at a suitable distance from it.

However when proceeding with a thermal welding operation on machines having a varying output, the adjustment of the machine is always effected at a small speed and the heat evolved by the heating element which may be for example in strip form is so adjusted at that instant as to produce a satisfactory welding operation. Such adjustment is performed manually because it is chiefly dependent upon the material to be worked up. After said adjustment has been completed, the normal production tempo is reached, whereupon the quantity of heat evolved by the heating element must be correspondingly increased so as to cause the quality of the weld to remain substantially constant irrespective of the speed at which it is conducted.

Manual control permitting this increase of the heating effect represents a practical disadvantage because the machine operator should focus his attention on many other factors when the operative speed is modified. Moreover, such manual control may be erroneous and as the operator becomes aware of blemishes in the welding action, rubbish may become fairly large where the production tempo is high.

A further object of the invention is to stave off this disadvantage and to permit a feed of the heating element to be obtained that automatically varies responsive to the operative speed so as constantly to produce a quantity of heat accurately matching the welding requirements once the preliminary adjustment has been correctly effected.

This result is obtained according to the invention by means of a feeding circuit for the heating element, said circuit including a self-saturated magnetic amplifier connected in series with said heating element and with a source of electric current, said amplifier comprising a base control circuit which is so fed as to supply enough heat to perform the welding operation at the set speed, and a varying control circuit associated with a tachometric dynamo driven synchronously with respect to the material to be welded and supplying to said varying circuit an electric current which varies responsive to the speed of travel of said material whereby the quantity of heat furnished by said element automatically remains proportionate to the operative speed, thereby permitting the upkeep of satisfactory welding conditions regardless of said speed.

A premagnetizing circuit is preferably associated with the magnetic amplifier so as to cause the same to be operative on the straight portion of its characteristic curve.

With these and such other objects in view as will incidentally appear hereafter, the invention comprises the novel steps and combination of steps which characterize the method, also the novel parts and combination of parts which characterize the device as will be described hereafter with reference to the accompanying drawing exemplifying the same and forming a part of the present disclosure.

In the drawings:
FIGURE 1 is a diagrammatic showing of the device.
FIGURE 2 is a diagram of a constructional form of the circuit for regulating the heating action responsive to the operative speed.
FIGURE 3 is a corresponding graph.

It is assumed in the drawing that the two flaps 1, 2 of a complex or composite assembly adapted to be welded together in the hot state and travelling on a carrier 3 must be coalesced along their longitudinal edges. It is also assumed that their weldable faces are oppositely located. Such faces are then engaged over and under a flat heating element 4 which, by applying direct radiating heat, brings them to a suitable soft condition for coalescence, whereafter the two composite flaps of the assembly travel between a pair of presser rollers 5 which finally weld them together.

In the showing of FIG. 2 is illustrated at 4 the strip-shaped elongated heating element which performs the heating action by radiation. As set forth, the strip 4 is connected to a circuit which is in series with a magnetic amplifier 6 of the self saturated type and to a transformer fed by the network and including a primary winding 8 and a secondary winding 9 connected by leads 10, 11 to a rectifier bridge 12 which performs the feed as indicated hereafter.

The magnetic amplifier 6 includes three control circuits designated respectively by 13, 14 and 15.

The circuit 13 is a premagnetizing circuit which permits the initial operative point of the system to be located at $P_1$ at the beginning of the straight portion of the characteristic curve connoting the adjustment of the magnetic amplifier 6 as indicated by the graph on FIG. 3 on which the heating intensities are plotted in ordinates while the ampere-turns of the control circuit are plotted in abscissae.

The circuit 14 is a control circuit for the adjustment. It permits the required quantity of heat corresponding to the adjustment speed of the welding circuit to be obtained prior to actual work by shifting the operative point of the amplifier on the straight portion of the curve as depicted by the graph in FIG. 3.

The control circuits 13 and 14 are fed from the rectifier bridge 12 through a circuit which includes a resistor 16 and a pair of condensers 17, 18, also an adjustable resistor 19 associated with the control circuit 13 and a potentiometer 20 associated with the control circuit 14.

The control circuit 15 performs the variation of the heating action in terms of the operative speed and is connected for that purpose to a tachometric dynamo 21 through an adjustable resistor 22. The dynamo 21 may be operatively associated with the carrier 3 or otherwise associated with the film 1 to rotate at a speed proportionate to the film travel velocity. Consequently the current which flows through the control circuit 15 responds to the flow speed of the material to be welded in front of the strip 4 of the welding device.

The operation of this control circuit will be better understood from an examination of FIG. 3. The point $P_1$ has been adjusted as indicated in the foregoing by means of a premagnetizing circuit 13 for permitting work to be conducted on the straight portion of the characteristic curve of the magnetic amplifier 6. Said point $P_1$ corresponds to a premagnetization A from the ordinate axis of the graph. The control circuit 14 ensures, owing to an adjustment of the potentiometer 20, a constant displacement B on the characteristic curve of the amplifier. To this displacement is added a further displacement $C_2$ which responds to the speed of the material as the heating action is initially adjusted so that the amplifier then operates at the point $P_2$ of the curve. As the speed increases, this point is moved to the right in FIG. 3 and assumes for example the position $P_3$ for a given flow speed of the material. Such displacement $C_3$ which sets the position of the point $P_3$ is in terms of the dynamo output i.e. it varies linearly responsive to the operative speed so that the quantity of heat which is supplied grows proportionately to said speed and always remains sufficient for performing a correct welding action.

Minor constructional details may be varied without departing from the ambit of the invention and the scope of the subjoined claims.

What is claimed is:

1. A device for mutually sealing composite sheet assemblies which are interweldable in the hot state by radiation of faces of preset zones of said assemblies and junction of said faces, comprising a flat strip-shaped element made of a material functioning as an electric resistor and adapted to radiate heat upon the current flow through said resistor element, a feeding circuit for supplying said element with electric energy, said circuit including a source of electric energy, a magnetic self-saturated amplifier connected in series with said flat element and with said source, a base control circuit associated with said amplifier for supplying to said element a heating current at a primary value, a varying control circuit also associated with said amplifier, a tachometric dynamo tapped in said varying control circuit for supplying the same with a varying electric current and for supplying to said element a heating current at a secondary value, the total heating current being made up of the sum of said heating currents at said primary and secondary values, means for shifting said preset zones of the assemblies along paths extending substantially parallel to said element and at preselected speeds, transmission means operatively connecting said shifting means and said tachometric dynamo so as to drive said dynamo at said preselected speeds whereby the temperature of said element is proportionate to said preselected speeds, means for bringing together said heated preset zones, and means for pressing said preset zones into mutual contact so as to achieve coalescence.

2. A device according to claim 1, wherein the self-saturated magnetic amplifier has a characteristic curve which includes a rectilinear portion and comprising a magnetizing circuit associated with said magnetic amplifier for subjecting it to a preliminary magnetization which causes the same to operate in the rectilinear portion of its characteristic curve.

3. A device for mutually sealing composite sheet assemblies capable of being interwelded in the hot state by radiation of faces of preset zones of said assemblies and junction of said faces, comprising a flat strip-shaped element made of a material functioning as an electric resistor for radiating heat due to its resistor function, shifting means for moving and guiding said preset zones of said assemblies on the opposite sides of the medial plane of said flat strip at preselected speeds, means for bringing and pressing together the heated faces of said preset zones of said assemblies for achieving coalescence, a feed circuit for supplying electric energy to said strip element, a source of electric current in said circuit, a self-saturated magnetic amplifier connected to said circuit in series with said strip element and said source, a base control circuit associated with said amplifier for supplying to said strip element a heating current at a primary value, a varying control circuit also associated with said amplifier, a tachometric dynamo tapped to said varying control circuit, and transmission means operatively interposed between said dynamo and said shifting means, said varying control circuit supplying to said strip element a heating current at a secondary value, the total heating current being equal to the sum of said currents at said primary and secondary values.

4. A device according to claim 3, wherein the self-saturated magnetic amplifier has a characteristic curve showing a rectilinear portion and including a magnetizing circuit so associated with said magnetic amplifier as to subject it to preliminary magnetization which causes the same to operate in the rectilinear portion of its characteristic curve.

5. Apparatus for coalescing synthetic films by heating the faces of the film to be coalesced comprising means transporting the film in a longitudinal direction, a stationary electrically heated member interposed between the opposed film faces to be heated, electric control means controlling the current supplied to said heated member and, hence, the temperature thereof, means pressing the heated film faces together to effect the coalescing and sensing means operatively associated with said film transporting means sensing the velocity of travel of said film and operatively associated with said control means regulating the current supplied to said heated element in accordance with the film velocity.

6. Apparatus as in claim 5 wherein said sensing means comprises a tachometric dynamo.

References Cited in the file of this patent

UNITED STATES PATENTS

| 2,293,568 | Snyder | Aug. 18, 1942 |
|---|---|---|
| 2,387,566 | Custers | Oct. 23, 1945 |
| 2,420,399 | New | May 13, 1947 |
| 2,617,007 | Atkins | Nov. 4, 1952 |
| 2,896,058 | Perryman | July 21, 1959 |